Patented Oct. 23, 1951

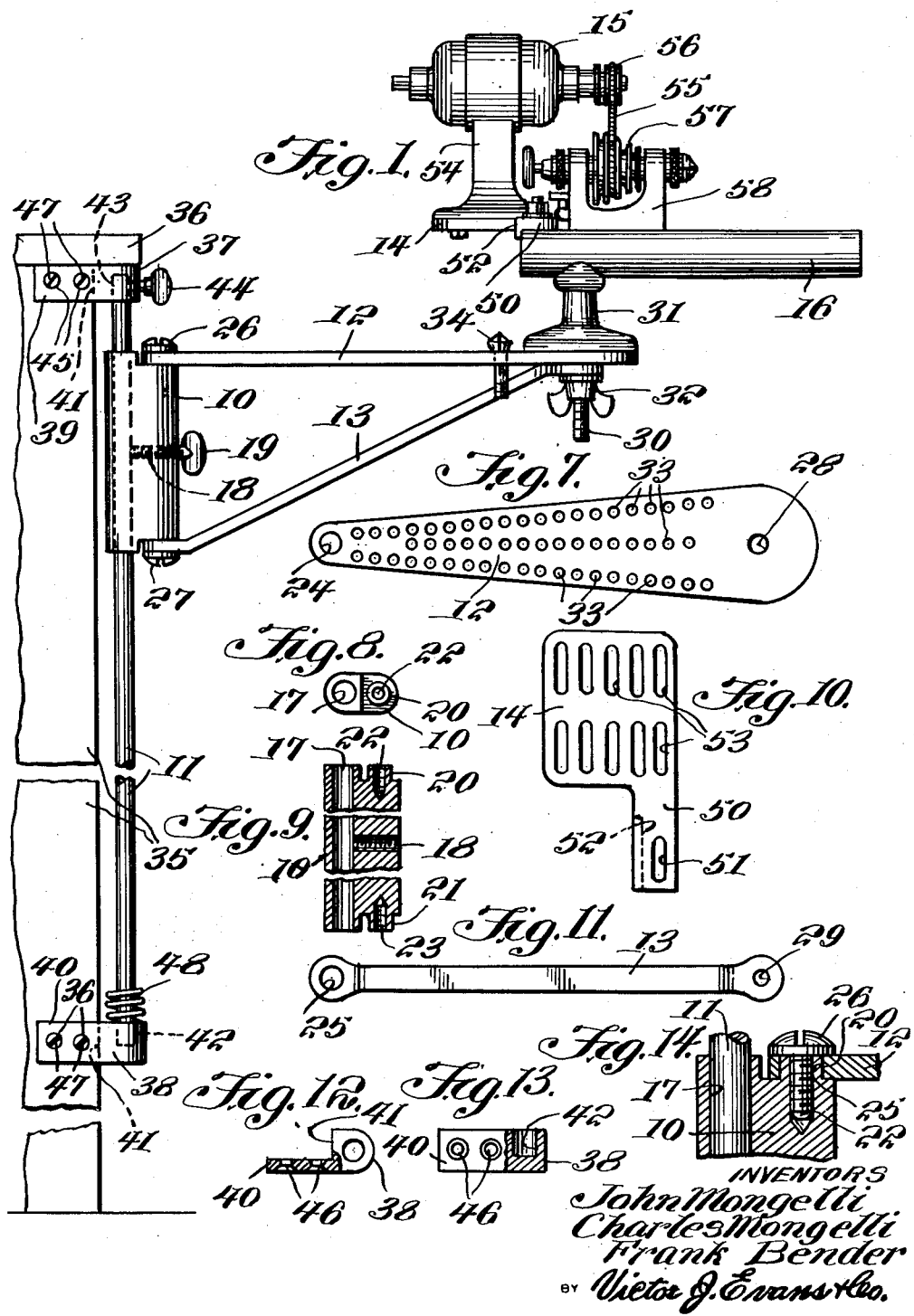

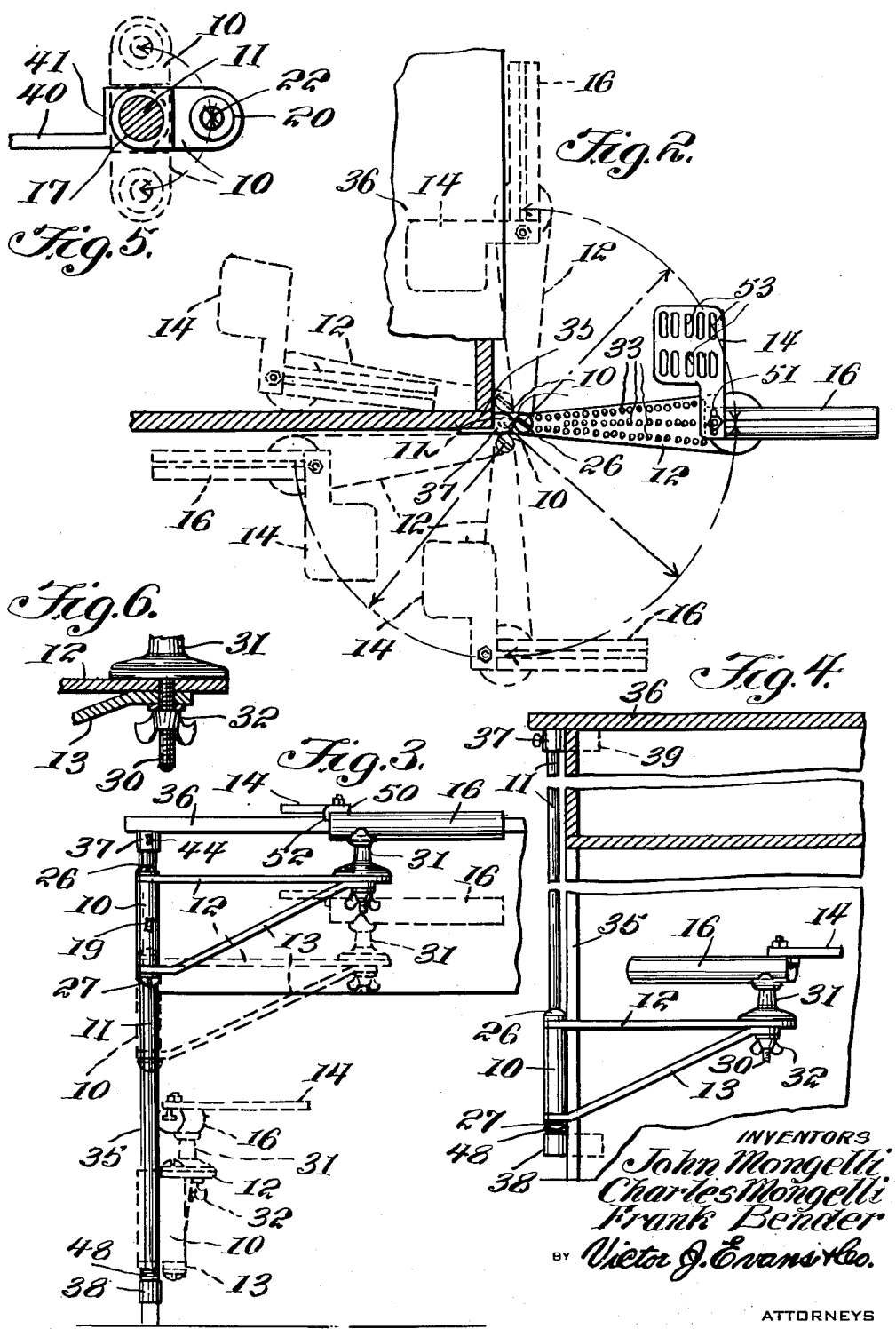

2,572,506

UNITED STATES PATENT OFFICE 2,572,506

LATHE AND MOTOR MOUNT

John Mongelli, Charles Mongelli, and Frank Bender, Washington, D. C.

Application December 9, 1948, Serial No. 64,364

3 Claims. (Cl. 248—16)

This invention relates to machine tools of the bench type particularly as used by watchmakers, and in particular a bench lathe mounting wherein a lathe may be moved to different positions to facilitate use thereof by a watchmaker working at a bench upon which the lathe is mounted.

The purpose of this invention is to provide means for mounting a watchmaker's lathe on a bench wherein the lathe may be brought to the operator and adjusted to a comfortable working position to facilitate use of the tool and to make it possible for the operator to work with greater accuracy.

Small portable lathes commonly known as watchmakers' lathes have been used on benches and as the lathes are small and of relatively light weight they are bolted to the bench to make them rigid. A lathe bolted on a bench in this manner is always in the way of the watchmaker and it is also inconvenient to use the lathe as it is necessary for the watchmaker to stand and carry the work from the position where he is working on the bench to the lathe. With this thought in mind this invention contemplates a comparatively flexible mounting for small lathes of this type wherein the surface of the work bench is free and unobstructed and, when not in use, the lathe may be adjusted to an out-of-the-way position, and when it is desired to use the lathe it may be moved to a convenient position where work may be performed thereon.

The object of this invention is, therefore, to provide a flexible mounting for supporting small machine tools on a bench whereby the tool may readily be positioned in a convenient location for use.

Another object of the invention is to provide an adjustable mounting for machine tools of the bench type, and means for mounting a motor, without removing the base thereof, on the mounting.

Another object of the invention is to provide an adjustable mounting for machine tools of the bench type in which means is provided for clamping the tool in different adjusted positions.

A further object of the invention is to provide an improved adjustable mounting for machine tools of the bench type which is of a simple and economical construction.

With these and other objects and advantages in view the invention consists of the new and useful combination, construction, and arrangement of parts as hereinafter more fully described, set forth in the claims appended hereto and disclosed in the accompanying drawings forming a part hereof, wherein:

Figure 1 is a side elevational view illustrating a watchmaker's lathe supported on a bracket adjustably mounted on a work bench, with parts of the work bench and supporting rod broken away.

Figure 2 is a plan view of the mounting bracket with the corner of the work bench shown in section and with the tool mounting elements shown in different positions in dotted lines.

Figure 3 is an elevational view similar to that shown in Figure 1, on a reduced scale, illustrating in full lines a position in which the machine tool may be suspended above a work bench and, in dotted lines, positions in which the tools may be folded under the work bench.

Figure 4 is a similar elevational view with the upper part of the work bench shown in section and showing the mounting bracket positioned under the work bench.

Figure 5 is a plan view of the vertically disposed tubular base of the mounting bracket showing the base in different positions in dotted lines.

Figure 6 is a detail showing a section through the outer end of the mounting bracket and illustrating the thumb nut and screw for clamping the tool in operative position on the bracket.

Figure 7 is a plan view of the upper arm of the mounting bracket with other parts omitted.

Figure 8 is a detail showing a plan view of the vertically disposed tubular base of the mounting bracket.

Figure 9 is a vertical section through the said tubular base with parts broken away.

Figure 10 is a plan view of a motor mounting plate by which a motor may be carried by the bed of a machine on the mounting bracket.

Figure 11 is a detail illustrating the diagonally position supporting brace of the mounting bracket.

Figure 12 is a detail showing a plan view of a bearing element for attaching the mounting bracket to the leg or post of a bench.

Figure 13 is a side elevational view of the bearing shown in Figure 12 with part broken away.

Figure 14 is a detail showing a section through the upper end of the vertically disposed tubular base illustrating the means for attaching the inner end of the upper horizontally disposed arm to the base.

Referring now to the drawings wherein like reference characters denote corresponding parts the bench lathe mounting of this invention includes a vertically disposed tubular base 10 slidably mounted on a rod 11 and having a horizontally disposed arm 12 with a brace 13, and the device also includes a plate 14 by which a motor 15 is mounted on a bed 16 of the machine tool.

The base 10 is formed as illustrated in Figures 8 and 9 with a vertically disposed opening 17 for the rod 11, a threaded opening 18 for a thumb screw 19 which secures the bracket in adjusted position on the rod 11, and alined extensions 20 and 21 with threaded openings 22 and 23 therein respectively.

The inner end of the arm 12 is provided with an opening 24 that fits over the extension 20 and the brace 13 is provided with an opening 25 that fits over the extension 21. The arm and brace are secured to the base by screws 26 and 27, respectively, as shown in Figure 1. The outer end of the arm 12 is also provided with an opening 28 and the brace 13 is provided with a similar opening 29 and with the parts assembled as illustrated in Figures 1 and 6 the clamp screw 30 extends through the openings 28 and 29, and with the screw extending downward from a support 31 of the bed 16 the tool is clamped on the bracket by a thumb nut 32. The arm 12 is provided with a plurality of openings 33 in which collets and other tools may be held as indicated by the numeral 34 in Figure 1.

The rod 11 is mounted on a post 35 of a bench or stand 36 by mounting bearings 37 and 38 which are formed as illustrated in Figures 12 and 13 with extending flanges 39 and 40 and with flat surfaces 41 at the intersection of the flanges with the bearing elements, which bear against the surface of the post 35. The bearing 38 is provided with a socket 42 that holds the lower end of the rod 11 and the bearing 37 is provided with a similar socket 43 in which the upper end of the rod is positioned. The bearing 37 is also provided with a thumb screw 44 for holding the rod. The flanges 39 and 40 are provided with bolt holes 45 and 46, respectively, by which the bearing elements are attached to the post 35 of the bench or the like and the bearings may be held by screws 47. A spring 48 is provided on the lower end of the rod 11 to provide a cushion for absorbing shocks as the bracket is lowered to the lower position in the mounting.

The motor mounting plate 14 is formed as illustrated in Figures 1 and 10 with a supporting arm 50 having an elongated slot 51 therein and the edge of the arm is provided with a lip or small flange 52 that is positioned against the end of the bed 16 to co-act with a bolt in the slot 51 to rigidly hold the plate on the bed of the machine tool. With the plate 14 supported through the slotted opening 51 the position of the motor may be adjusted to take up slack in the belt, and with the plate supported by the offset arm 50 the motor may be installed in the bed with the pulleys alined with the headstock substantially in the usual position. The plate is provided with slotted openings 53 by which motors of different sizes may be bolted thereto and with the plate arranged in this manner the motor may be mounted on the bed of the tool without removing the foot or stand 54. With the motor positioned as illustrated in Figure 1 the tool may be operated by the motor through a belt 55 which is positioned on a motor pulley 56 and a cone pulley 57 of the headstock 58 of the tool. It will also be appreciated that the machine tool may be provided with the usual tailstock or other work or tool holding elements.

With the parts arranged in this manner a small machine tool, such as a watchmaker's lathe, may be mounted on a work bench or table and when not in use the tool may be folded to a position under the table as shown in Figure 4 or it may be turned or adjusted to substantially any position as indicated by the dotted lines in Figure 2 so that instead of a watchmaker leaving his bench and standing up to work on the lathe the lathe may be brought into operative position whereby the operator may turn down or face a bushing or the like and then turn around and fit the bushing in the operative position. The tool may be swung to an operative position over the work bench or used at either side or at any suitable elevation as may be desired.

It will be understood that modifications may be made in the design and arrangement of the parts without departing from the spirit of the invention.

What is claimed is:

1. A mounting bracket for machine tools comprising a vertically disposed tubular base, a vertically positioned rod on which the said tubular base is slidably mounted, bearing elements having sockets in which the ends of the rod are positioned for mounting the rod on a post of a work bench, a horizontally disposed arm pivotally mounted on the upper end of the tubular base and extended outwardly therefrom, a diagonally positioned brace pivotally attached to the lower end of the said tubular base and extended outwardly under the said arm, said arm and brace having registering openings therein, means clamping the said vertically disposed tubular base on the rod, a machine tool bed having a stud with a thumb nut thereon mounted on the outer end of the arm with the thumb nut clamping the bed in position and a motor mounting plate having a plurality of slotted bolt receiving openings therein and having an extended arm also having a slotted bolt receiving opening therein clamped by a bolt through the slotted bolt receiving opening of the said extended arm to the said machine tool bed.

2. A mounting bracket for machine tools comprising a vertically disposed tubular base, a vertically positioned rod on which the said tubular base is slidably mounted, bearing elements having sockets in which the ends of the rod are positioned for mounting the rod on a post of a work bench, a horizontally disposed arm pivotally mounted on the upper end of the tubular base and extended outwardly therefrom, a diagonally positioned brace pivotally attached to the lower end of the said tubular base and extended outwardly under the said arm, said arm and brace having registering openings therein, means clamping the said vertically disposed tubular base on the rod, a machine tool bed having a stud with a thumb nut thereon mounted on the outer end of the arm with the thumb nut clamping the bed in position and a motor mounting plate having a plurality of slotted bolt receiving openings therein and having an extended arm also having a slotted bolt receiving opening therein clamped by a bolt through the slotted bolt receiving opening of the said extended arm to the said machine tool bed, said extended arm of the motor mounting plate having a flange on one side thereof and said flange positioned against the end of the machine tool bed for positioning the motor mounting plate thereon.

3. In a mounting bracket for machine tools of the bench type, the combination which comprises a vertically disposed supporting rod, means mounting the rod on a vertical member of a bench or the like, an outwardly extended bracket slidably mounted on said rod, means clamping the bracket in adjusted position on the rod, means clamping a machine tool on the outer end of the bracket, and a mounting plate having an extended arm thereon with bolt receiving openings in the plate and arm for mounting a motor on the bed of a machine tool mounted on the bracket.

JOHN MONGELLI.
CHARLES MONGELLI.
FRANK BENDER.

REFERENCES CITED

The following references are of record in the file of this patent:

UNITED STATES PATENTS

| Number | Name | Date |
|---|---|---|
| 945,528 | Harvey | Jan. 4, 1910 |
| 1,050,234 | Rowe | Jan. 14, 1913 |
| 1,358,322 | McIntosh | Nov. 9, 1920 |
| 2,090,818 | Stanley | Aug. 24, 1937 |
| 2,127,745 | Lochman | Aug. 23, 1938 |
| 2,298,741 | Lazna | Oct. 13, 1942 |